US006496765B1

(12) United States Patent
Robinett, III et al.

(10) Patent No.: US 6,496,765 B1
(45) Date of Patent: Dec. 17, 2002

(54) CONTROL SYSTEM AND METHOD FOR PAYLOAD CONTROL IN MOBILE PLATFORM CRANES

(75) Inventors: Rush D. Robinett, III, Tijeras; Kenneth N. Groom; John T. Feddema, both of Albuquerque, all of NM (US); Gordon G. Parker, Houghton, MI (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/695,815

(22) Filed: Oct. 24, 2000

Related U.S. Application Data

(60) Provisional application No. 60/214,840, filed on Jun. 28, 2000.

(51) Int. Cl.[7] .......................... G06F 19/00; G06G 7/00; B66C 13/06

(52) U.S. Cl. ......................... 701/50; 212/272; 212/273; 212/275; 340/685

(58) Field of Search ....................... 701/50, 1; 212/270, 212/275, 276, 278, 225, 272, 273, 223–227, 255, 256; 340/685, 632, 540, 679; 248/660, 662, 654, 550; 318/632

(56) References Cited

U.S. PATENT DOCUMENTS

| | | | | |
|---|---|---|---|---|
| 4,997,095 A | * 3/1991 | Jones et al. | 212/275 |
| 5,526,946 A | 6/1996 | Overton | 212/275 |
| 5,742,145 A | * 4/1998 | Khorrami et al. | 318/632 |
| 5,785,191 A | 7/1998 | Feddema et al. | 212/275 |
| 5,908,122 A | 6/1999 | Robinett et al. | 212/275 |
| 5,954,310 A | * 9/1999 | Soldo et al. | 248/660 |
| 5,960,969 A | * 10/1999 | Habisohn | 212/275 |
| 5,961,563 A | 10/1999 | Overton | 701/50 |
| 6,050,429 A | * 4/2000 | Habisohn | 212/275 |
| 6,102,221 A | * 8/2000 | Habisohn | 212/275 |

OTHER PUBLICATIONS

Parker, et al., "Operator In–The–Loop Control of Rotary Cranes," Proceedings of the SPIE Symposium on Smart Structures and Materials, Industrial Applications of Smark Structures Technologies, San Diego, CA, vol. 2721, pp 364–372, Feb. 27–29, 1996.

Lewis, et al., "Command Shaping Control of an Operator–in–the–Loop Boom Crane," Proceedings of the 1998 American Control Conference, Jun. 24–26, 1998.

Parker, et al., "Experimental Verification of a Command Shaping Boom Crane Control System," American Controls Conference 1999, Jun. 2, 1999, San Diego, CA, referred to as "Parker '99".

Groom, et al., "Swing–free Cranes via Input Shaping of Operator Commands," ISARC, Madrid, Spain, Sep. 22, 1999.

Koivo, "Fundamentals for Control of Robotic Manipulators," John Wiley & Sons, Inc., 1999.

* cited by examiner

*Primary Examiner*—Jacques H. Louis-Jacques
(74) *Attorney, Agent, or Firm*—Suzanne L. K. Rountree

(57) ABSTRACT

A crane control system and method provides a way to generate crane commands responsive to a desired payload motion to achieve substantially pendulation-free actual payload motion. The control system and method apply a motion compensator to maintain a payload in a defined payload configuration relative to an inertial coordinate frame. The control system and method can further comprise a pendulation damper controller to reduce an amount of pendulation between a sensed payload configuration and the defined payload configuration. The control system and method can further comprise a command shaping filter to filter out a residual payload pendulation frequency from the desired payload motion.

27 Claims, 12 Drawing Sheets

FIG. 8
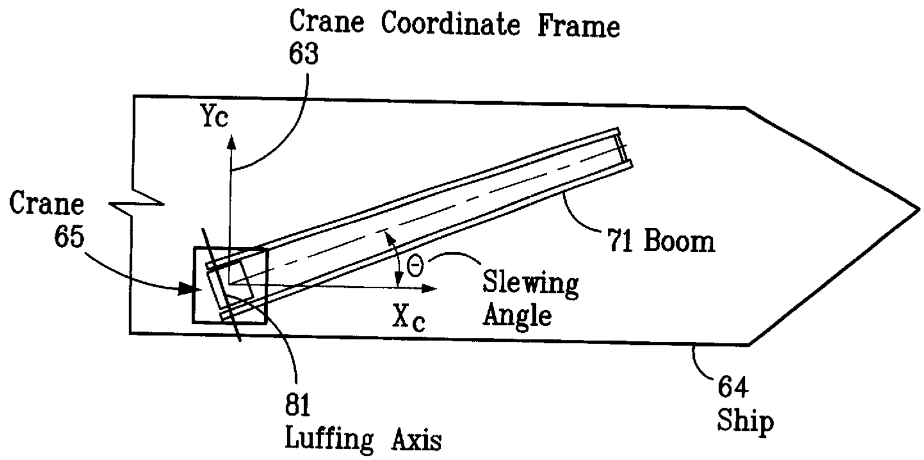
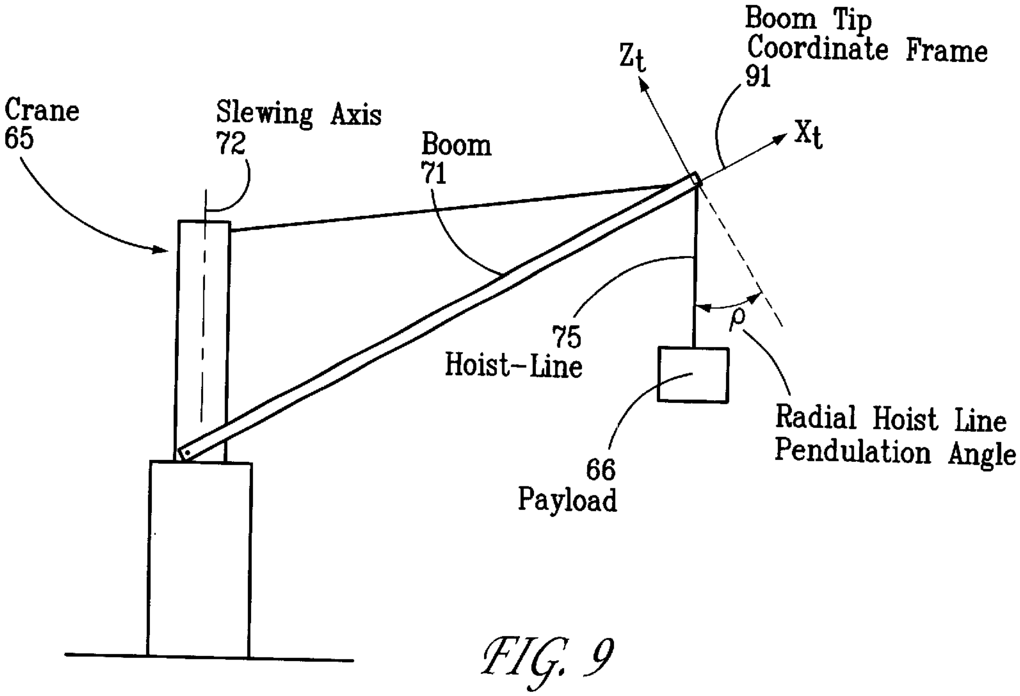
FIG. 9

CONTROL SYSTEM AND METHOD FOR PAYLOAD CONTROL IN MOBILE PLATFORM CRANES

This application claims the benefit of U.S. Provisional Application No. 60/214,840, filed Jun. 28, 2000, incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of cranes and more particularly to the control systems and methods for controlling payload pendulation associated with motion of suspended payloads using cranes mounted with mobile platforms.

Cranes are used in virtually any large-scale construction or cargo transportation operation. As an example, the commercial shipping industry has been moving toward high speed non-self-sustaining container ships which do not have onboard cranes. In general, large pier-side cranes are use to load and unload the ships. Disaster relief operations, as well as military operations, have the problem of offloading and onloading container ships and moving supplies ashore in the absence of port facilities. Cranes mounted with a dedicated crane ship can transfer cargo from container ships to small landing craft for transport to shore. In a more difficult cargo transportation example, ships can be replenished while at sea.

During ship offloading and onloading operations, environments lacking a protective harbor subject crane ships to wave motion which can result in motion of the ship which in turn can excite pendulation of a hoisted container. Damage to personnel, cargo, and the participating ships can occur if the payload undergoes excessive pendulation.

In a typical payload transfer maneuver, a crane operator uses translation, rotation, and lifting operations. Often, inexperienced operators must perform transfers at rates sufficiently slow in order to reduce unwanted payload pendulation. Unfortunately, slow crane maneuvers can increase the cost and time involved to move cargo. Additionally, if platform motion and/or wind exists, workers must use tag-lines to steady the cargo, further increasing cost and time. If these disturbances are significant, cargo operations must stop for safety reasons.

CRANE CATEGORIES

One category of cranes consists of overhead gantry cranes. A second category of cranes consists of rotary cranes, of which there are two types: rotary jib cranes and rotary boom cranes. The primary crane differences, from a kinematics viewpoint, are the number of motion degrees-of-freedom (DOF), the type of motion provided: prismatic motion or rotational motion, and the relative connection via substantially rigid links.

An overhead gantry crane incorporates a trolley which can translate in one or two directions in a horizontal plane. Attached to the trolley is a load-line for payload attachment, which can have varying load-line length. Overhead gantry cranes are suitable for construction and transportation applications where the physical environment supports the crane's required physical overhead structure. Gantry cranes can have three translational motion degrees-of-freedom: two directions of trolley translation and one vertical translation of load-line length (for example, left-right, forward-backward, and up-down translations). Overhead gantry cranes generally have this structure where the primary DOF for end-effector motion are prismatic (i.e., translational) and oriented at right angles.

A rotary jib crane incorporates a trolley which can move along a horizontal jib, which in turn is attached to a rotatable vertical column attached to a crane base. Rotary jib cranes can have three degrees-of-freedom. The first is a column rotation about a vertical axis at the crane base, such that a load-line attachment point undergoes rotation. The second is a horizontal translation of the trolley along the horizontal-fixed-elevation jib, as in a gantry crane. The third is a variable load-line length, also a translation. Rotary jib cranes generally have this structure where the primary DOF for end-effector motion are one rotary joint followed by two prismatic joints.

A rotary boom crane configuration can have a crane column horizontally rotatable about a vertical axis, a luffing boom attached to the column, and a pendulum-like flexible-link attached to the distal end of the boom. A rotary boom crane can have one translation degree of freedom (variable flexible-link length in hoisting) and two rotation degrees of freedom: rotation about the crane column (slewing) and boom elevation through a vertical angle (luffing). Positioning of a payload that pendulates from the flexible-link is accomplished through luff, slew, and hoist commands. Because of kinematic differences between a rotary boom crane and a rotary jib crane, a rotary boom crane configuration has different payload dynamics from a rotary jib crane.

PAYLOAD PENDULATION

When a hoisted payload is disturbed, the payload and load-line move like a spherical pendulum about the load-line to manipulator attachment point. As an example, a payload moved by a rotary boom crane can be described by two oscillatory degrees of freedom. The first is payload pendulation tangential to an arc traced by the distal end of the boom while slewing the crane (or equivalently, a motion tangential to the column axis of rotation). The second is a payload pendulation radial to the column axis of rotation. Both radial and tangential pendulation are defined as having a zero value when the flexible-link is parallel to a gravitational vector. At the end of a typical point-to-point maneuver, the payload can oscillate in both the radial and tangential directions. The degree of pendulation is dependent on the specific maneuver. The yaw of the payload relative to the flexible-link can be important in some applications.

CRANE CONTROL SYSTEMS FOR PAYLOAD PENDULATION

Pendulation or sway control has been disclosed for overhead gantry cranes and for rotary cranes in stationary environments.

Feddema et al., U.S. Pat. No. 5,785,191 (1998), is an example of operator control systems and methods for pendulation-free motion in gantry-style cranes. Feddema et al. discloses use of an infinite impulse response filter and a proportional-integral feedback controller to dampen payload pendulation in a crane having a trolley moveable in a horizontal plane and having a payload suspended by variable-length flexible-link for payload movement in a vertical plane. Feddema teaches the use of filters and feedback controllers to remove operator-induced pendulation and to dampen residual pendulation in gantry cranes in a stationary environment. Feddema does not teach compensation for payload pendulation due to motion of a platform with which the crane is mounted.

Robinett et al, U.S. Pat. No. 5,908,122 (1999), is an example of a pendulation control method and system for rotary jib cranes. Robinett et al. discloses use of an input shaping filter to reduce pendulation of rotary jib crane payloads during operator commanded maneuvers or computer-controlled maneuvers. Robinett teaches the use of input shaping filters to remove payload pendulation induced by commands to rotary jib cranes mounted with a stationary platform. Robinett does not teach anything about reduction of unwanted payload pendulation due to motion of a platform with which the crane is mounted.

Parker et al, "Operator in-the-loop Control of Rotary Cranes," Proceedings of the SPIE Symposium on Smart Structures and Materials, Industrial Applications of Smart Structures Technologies, San Diego, Calif. Vol. 2721, pp. 364–372, Feb. 27–29, 1996, teaches the use of command shaping filters to remove payload pendulation induced by operator commands to rotary jib cranes in a stationary environment. Parker does not teach anything about reduction of unwanted payload pendulation due to motion of a platform with which the crane is mounted.

Lewis et al., "Command Shaping Control of a Operator-in-the-Loop Boom Crane," Proceedings of the 1998 American Control Conference, June 24–26, 1998, incorporated herein by reference, is an example of a command shaping control method for rotary boom cranes. Lewis et al. discloses a method of filtering pendulation frequency using an adaptive forward path command shaping filter to reduce payload pendulation in a rotary boom crane. Lewis teaches the use of command shaping filters to remove payload pendulation induced by operator commands to rotary boom cranes in a stationary environment. Lewis does not teach anything about reduction of unwanted payload pendulation due to motion of a platform with which the crane is mounted.

The control systems and methods discussed above teach removal of operator-induced payload pendulation in environments where a crane base is not subject to motion as in an oscillatory environment. Control of command-induced payload pendulation depends on the kinematics of the crane. Motion of a platform with which a crane is mounted also can induce payload pendulation. The control systems and methods discussed above do not teach reduction of unwanted payload pendulation due to motion of the platform with which the crane is mounted.

Overton, U.S. Pat. No. 5,526,946 (1996), is an example of an anti-pendulation control method for level-beam, cantilever cranes, such as gantry cranes and overhead-transport devices. Overton teaches use of a double-pulse approach with precisely-timed acceleration pulses to control a trolley to reduce operator-induced pendulation and to damp pendulation due to external disturbances. Overton does not teach isolation of payload and flexible link from platform motion.

Overton, U.S. Pat. No. 5,961,563 (1999), hereinafter referred to as Overton'99, is an example of anti-pendulation control method for rotating boom cranes. Overton'99 teaches use of a double-pulse approach with precisely-timed acceleration pulses to control a crane to reduce operator-induced pendulation and to damp pendulation due to external disturbances. Overton does not teach isolation of payload and flexible link from platform motion.

Accordingly, there is an unmet need to isolate the payload and flexible link from platform motion throughout a desired payload motion.

SUMMARY OF THE INVENTION

The present invention isolates the payload and flexible link from platform motion throughout a desired payload motion. The present invention comprises a control system and method for generating crane commands from a desired payload motion for substantially pendulation-free actual payload motion, wherein the crane is mounted with a mobile platform. This control system comprises a sensor system and a control computer for generating crane commands corresponding to the desired payload motion, adapted to maintain the payload at a defined configuration relative to an inertial frame.

The present invention comprises a platform motion sensor, indicative of a base platform motion relative to an inertial frame, and a motion compensator, responsive to the platform motion sensor, generating crane commands to maintain a crane payload substantially in a defined configuration relative to the inertial frame and indicative of the desired payload motion. In the defined payload configuration, a crane flexible-link is substantially parallel to a gravity vector.

The present invention can further comprise a pendulation damper controller, responsive to a payload configuration sensor, determining an amount of pendulation from a difference between a current actual payload configuration and the defined payload configuration and driving the crane to reduce the amount of pendulation. The present invention can further comprise a command shaping filter, adapted to generate a defined payload configuration by filtering out a residual payload pendulation frequency of the crane from the desired payload motion.

A method according to the present invention generates crane commands to achieve a desired payload motion by compensating for platform motion to maintain a crane payload in a defined configuration relative to an inertial frame. The present invention can further comprise damping payload pendulation. The present invention can further comprise filtering out a residual payload pendulation frequency from the desired payload motion.

BRIEF DESCRIPTION OF THE FIGURES

The accompanying drawings, which are incorporated into and form part of the specification, illustrate embodiments of the invention and, together with the description, serve to explain the principles of the invention.

FIG. 8 is a detailed top view diagram of an example crane utilizing the control system of the present invention.

FIG. 9 is a detailed side view diagram showing a radial hoist-line pendulation angle for an example crane utilizing the control system of the present invention.

DETAILED DESCRIPTION OF THE INVENTION

The present invention comprises a control system and method for generating crane commands from a desired payload motion for substantially pendulation-free actual payload motion, wherein the crane is mounted with a mobile platform. This control system comprises a sensor system and a control computer for generating crane commands corresponding to the desired payload motion, adapted to maintain the payload at a defined configuration relative to an inertial frame.

The present invention comprises a platform motion sensor, indicative of a base platform motion relative to an inertial frame and a motion compensator, responsive to the platform motion sensor, generating crane commands to maintain a crane payload substantially in a defined payload configuration relative to the inertial frame and indicative of the desired payload motion. The present invention can further comprise a pendulation damper controller, responsive to a payload configuration sensor, determining an amount of pendulation from a difference between a current actual payload configuration and the defined payload configuration and driving the crane to reduce the amount of pendulation. The present invention can further comprise a command shaping filter, generating a defined payload configuration by filtering out a residual payload pendulation frequency of the crane from the desired payload motion.

TERMINOLOGY

A crane manipulator comprises substantially rigid links connected by rotary or prismatic joints that are powered by motors.

Crane commands, as used in this specification, comprise anything that makes the crane work (for example, commands to drive motors). Examples of crane commands include velocity or position commands, which can be mutually derivable, as well as torque commands.

Motion is a velocity or an acceleration of something (for example, payload motion is a velocity or acceleration of something that has mass).

A desired payload motion is the motion of a payload as requested by an operator or an automatic system functioning as the operator and represented in a form suitable for input to a control computer. Desired payload motion can change as a function of time and can be referred to as commands for point-to-point moves, each resulting in a new defined payload configuration.

A configuration comprises a position and an orientation. A defined payload configuration is a position and orientation of a payload in inertial space and can change as a function of time. A platform configuration comprises a position and an orientation of a mobile platform. A crane configuration comprises a position and an orientation of each of the substantially rigid links and manipulator joints in each crane manipulator and the length of the flexible-link.

CRANE WITH CONTROL SYSTEM

Figure 1:
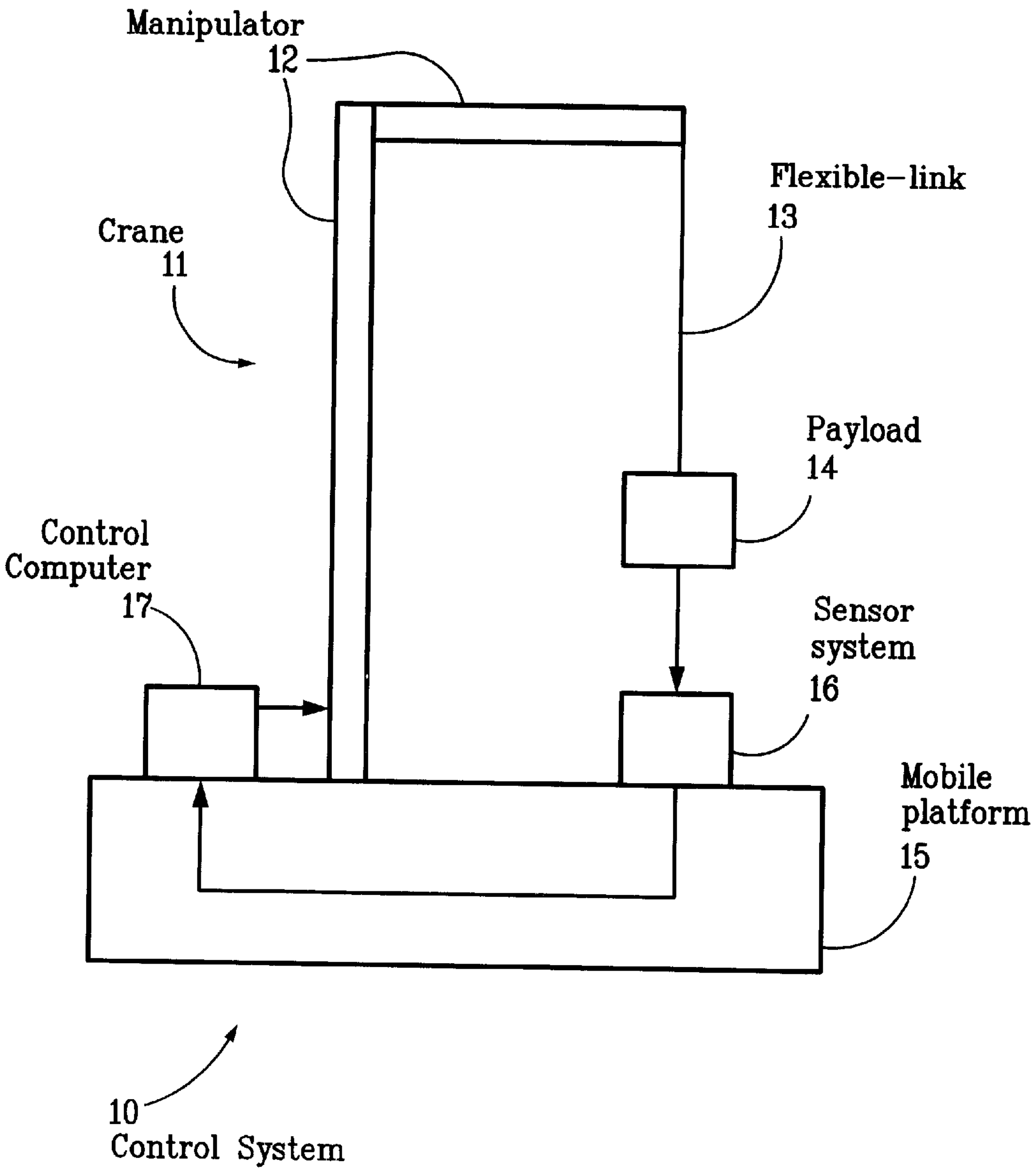
FIG. 1 is a high level schematic representation of a crane using a crane control system of the present invention.

FIG. 1 is a high level schematic representation of a crane using crane control system 10 of the present invention. FIG. 1 shows crane 11 with manipulator 12, flexible-link 13, and payload 14 suspended from flexible-link 13. Crane 11 can be mounted with mobile platform 15. Crane control system 10 has sensor system 16, outputting a measure of motion to control computer 17. Control computer 17 responds to motion determined from sensor system 16 and generates crane commands from a desired payload motion for substantially pendulation-free actual payload motion to maintain flexible-link 13 and payload 14 in a defined configuration relative to an inertial frame. Flexible-link 13 is attached at one end to payload 14 to be moved and at the other end to manipulator 12. The distance between payload 14 and manipulator 12 is the length of the flexible-link and can be variable.

Manipulator 12 can comprise substantially rigid manipulator links connected by manipulator joints, which can be powered by motors. Each manipulator joint can be called a degree-of-freedom and can be rotary or prismatic. The purpose of the degrees-of-freedom is to move and to configure a manipulator link endpoint relative to the base of the manipulator. Flexible-link 13 can be attached to the distal end of manipulator 12, as shown in FIG. 1, or can be attached at any other manipulator location convenient for manipulating payload 14. Flexible-link 13, for example, can be a cable, a chain, segmented rods, or other apparatus known to crane manufacturers and capable of suspending payload 14. Sensor system 16 can include platform motion sensors and payload configuration sensors.

Control computer 17 can be a device for controlling the system and can comprise a motion compensator, a pendulation damper controller, and a command shaping filter.

Control computer 17, for example, can be a digital computer, an analog computer, a neural network device, or other command generating and processing device.

Applicable Crane Types

The crane control system can comprise gantry-crane-commands comprising translational velocities in one or two axes. The crane control system can comprise rotary-jib-crane-commands comprising prismatic velocity and rotational velocity. The crane control system can comprise rotary-boom-crane-commands comprising two rotational velocities: boom rotation about the crane column and boom elevation through a vertical angle. Each of the crane types can also produce vertical payload translations due to variable length flexible-link.

MOTION COMPENSATION

Crane control system 10 can maintain the payload in a defined configuration to reduce the effects of motion of mobile platform 15. Control computer 17 can be a motion compensator, responding to sensor system 16 and generating commands that maintain payload 14 in a defined configuration relative to an inertial frame. Sensor system 16 can be a platform motion sensor and can sense a motion of a base platform relative to the inertial frame.

The defined payload configuration can be generated from the desired payload motion which can be generated from an operator's joystick or can be automatically generated by a computer functioning for the operator. The defined payload configuration can correspond to keeping a crane flexible-link substantially parallel to a gravity vector.

Examples of cranes mounted with a base platform experiencing motion can include cranes mounted with moving vehicles such as ships and helicopters, cranes buffeted by the environment such as wind and rain, and cranes experiencing other types of motion.

Sensors and Controllers

An inertial frame can be defined to be a fixed position relative to earth. Using this fixed inertial position, a mobile platform (for example, a ship) can be described as having a position or orientation relative to the inertial frame. Motion of a ship can be expressed in naval or aviation measuring coordinates such as roll, pitch, yaw, heave, surge, and sway. See Koivo, Fundamentals for Control of Robotic Manipulators, John Wiley & Sons, Inc., 1989. Motion of the ship can be measured relative to the inertial frame. Sensor system 16 can be a platform motion sensor and can include: rate sensors, inertial sensors, inertial position units, inertial navigation units, global positioning systems, inclinometers, accelerometers, gyroscopes, other sensors that give mobile platform position and orientation relative to inertial reference coordinates, and combinations of the above.

The control system can be used with crane servo controllers (for example, velocity and position servo controllers) and motors to move the crane resulting in the defined payload configuration for substantially pendulation-free actual payload motion.

PENDULATION DAMPING

Figure 2:
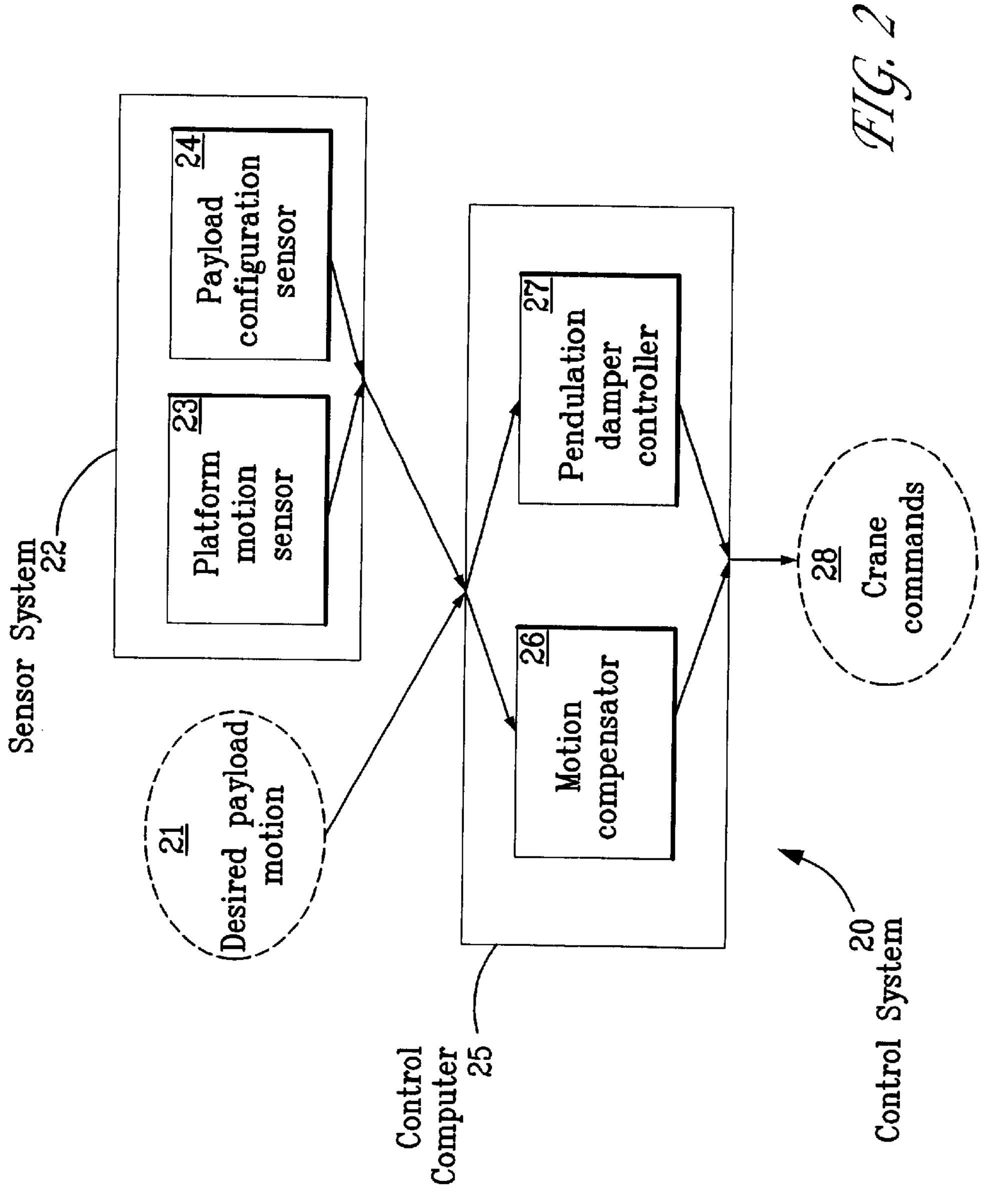
FIG. 2 is a high level schematic representation of a control system according to the present invention that combines motion compensation with pendulation damping.

FIG. 2 is a high level schematic representation of a control system that combines motion compensation with pendulation damping. Since non-linearities and unmodeled disturbances during motion compensation can cause some pendulation, a pendulation damper mitigates these sources of pendulation. In FIG. 2, desired payload motion 21 can be specified for control system 20 for generating crane commands 28 to achieve pendulation-reduced motion. Control computer 25 can respond to desired payload motion 21 and motion sensed by sensor system 22, then control computer 25 can generate crane commands 28 to control the crane.

Sensors and Controllers

Sensor system 22 can be platform motion sensor 23 and payload configuration sensor 24. Control computer 25 comprises motion compensator 26, as discussed above for motion compensation for control computer 17, and further comprises pendulation damper controller 27. Pendulation damper controller 27 can respond to payload configuration sensor 24 and generate crane commands 28 to reduce an amount of pendulation from a difference between a sensed payload configuration and a defined payload configuration to damp payload motion. The defined payload configuration can correspond to zero pendulation of the flexible-link and the payload.

Platform motion sensor 23 can include examples as discussed above for a platform motion sensor for sensor system 16. Payload configuration sensor 24 can comprise, for example, mechanical flexible-link or cable deflection sensors using encoders and/or potentiometers or other positioning devices, laser cable position sensors, optical payload tracking, radar, structured lighting, comparative sensing, absolute position sensors, multi-dimensional infrared trackers, rate sensors, accelerometers, geographic position systems, inertial navigation units, and other methods capable of determining payload configuration, and combinations thereof.

For example, a mechanical cable pendulation sensor can determine payload configuration relative to a crane by measuring the angle of the flexible-link at its attachment point to the manipulator, determining the length of the flexible-link, and resolving the forward kinematics of the manipulator.

Examples of absolute position sensors can include radar and multi-dimensional infrared tracker sensors, for example those commercially available from Optitrack.

Pendulation damper controller 27 can include for example, variable structure controllers, sliding mode controllers, proportional controllers, lead compensators, pendulation cancellation methods, and combinations of the above.

COMMAND SHAPING

Figure 3:
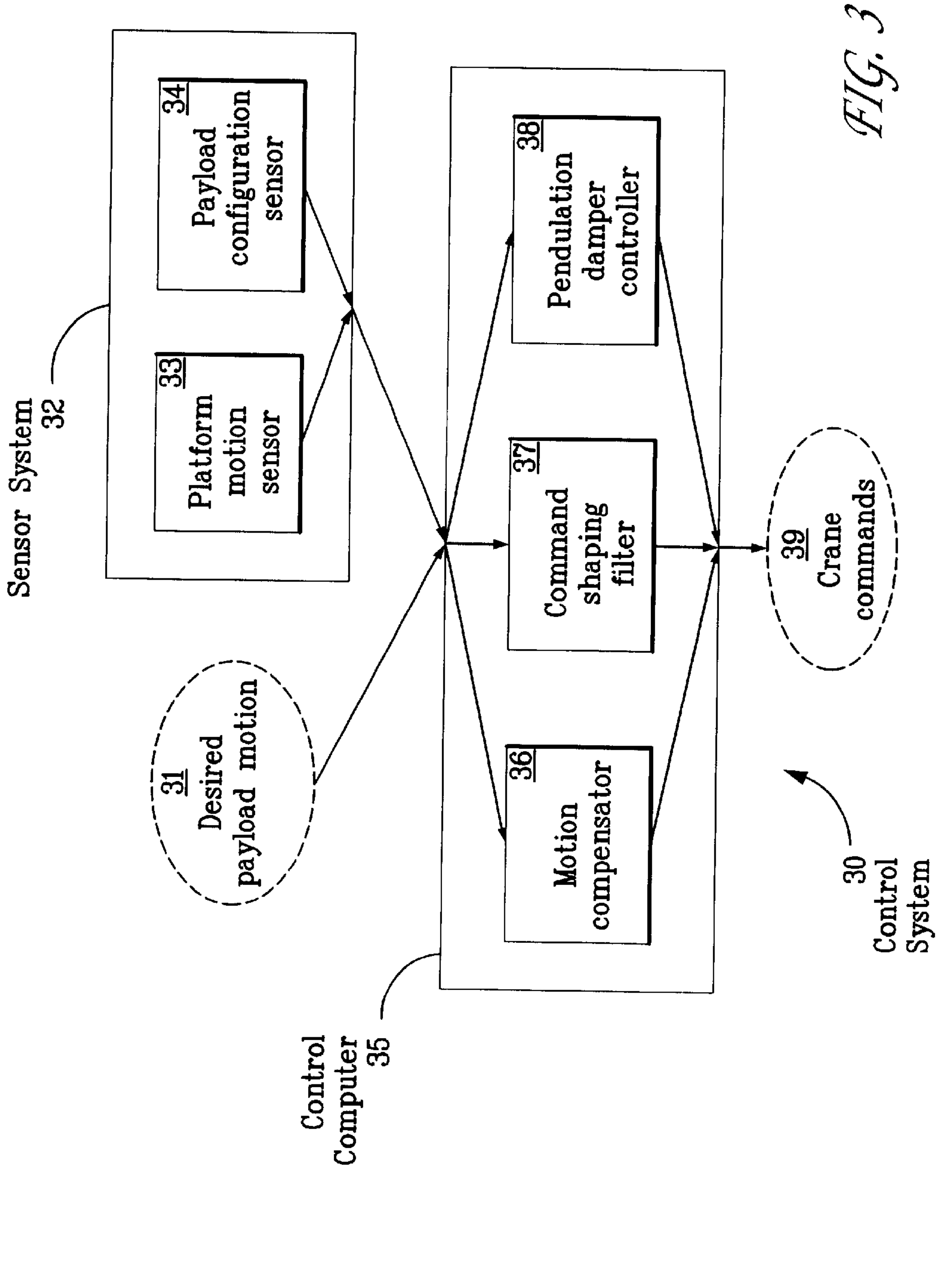
FIG. 3 is a high level schematic representation of a control system according to the present invention that combines motion compensation, pendulation damping, and command shaping.

FIG. 3 is a high level schematic representation of a control system that combines motion compensation, pendulation damping, and command shaping, and further comprises details of sensor system 16 and control computer 17 shown in FIG. 1. The command shaper allows the payload to be move from one defined configuration to the next, as directed by the desired payload motion, with minimal pendulation resulting from the move. In FIG. 3, control system 30 can generate crane commands 39 corresponding to desired payload motion 31. Control computer 35 can respond to desired payload motion 31 and to motion determined by sensor system 32, then control computer 35 can generate crane commands 39 to control the crane.

Sensors and Controllers

Sensor system 32 can be platform motion sensor 33 and payload configuration sensor 34. Control computer 35 comprises motion compensator 36 and pendulation damper controller 38, as discussed above for motion compensation and pendulation damping, and further comprises command shaping filter 37. Command shaping filter 37 can respond to desired payload motion 31 and generate commands that filter out a residual payload pendulation frequency from desired payload motion 31. Examples of platform motion sensors and payload configuration sensors are discussed above for motion compensation and pendulation damping.

Examples of command shaping filter 37 can include: double pulse filters, notch filters, filters for pulse sequences convolved with inputs, and combinations of the above.

JOINT SPACE IMPLEMENTATION OF PENDULATION DAMPER

Pendulation damping can be combined into a control structure with motion compensation and/or input shaping in an number of ways. Two prominent methods are referred to as the "Joint Space Method" and the "Cartesian Space Method".

Figure 4:
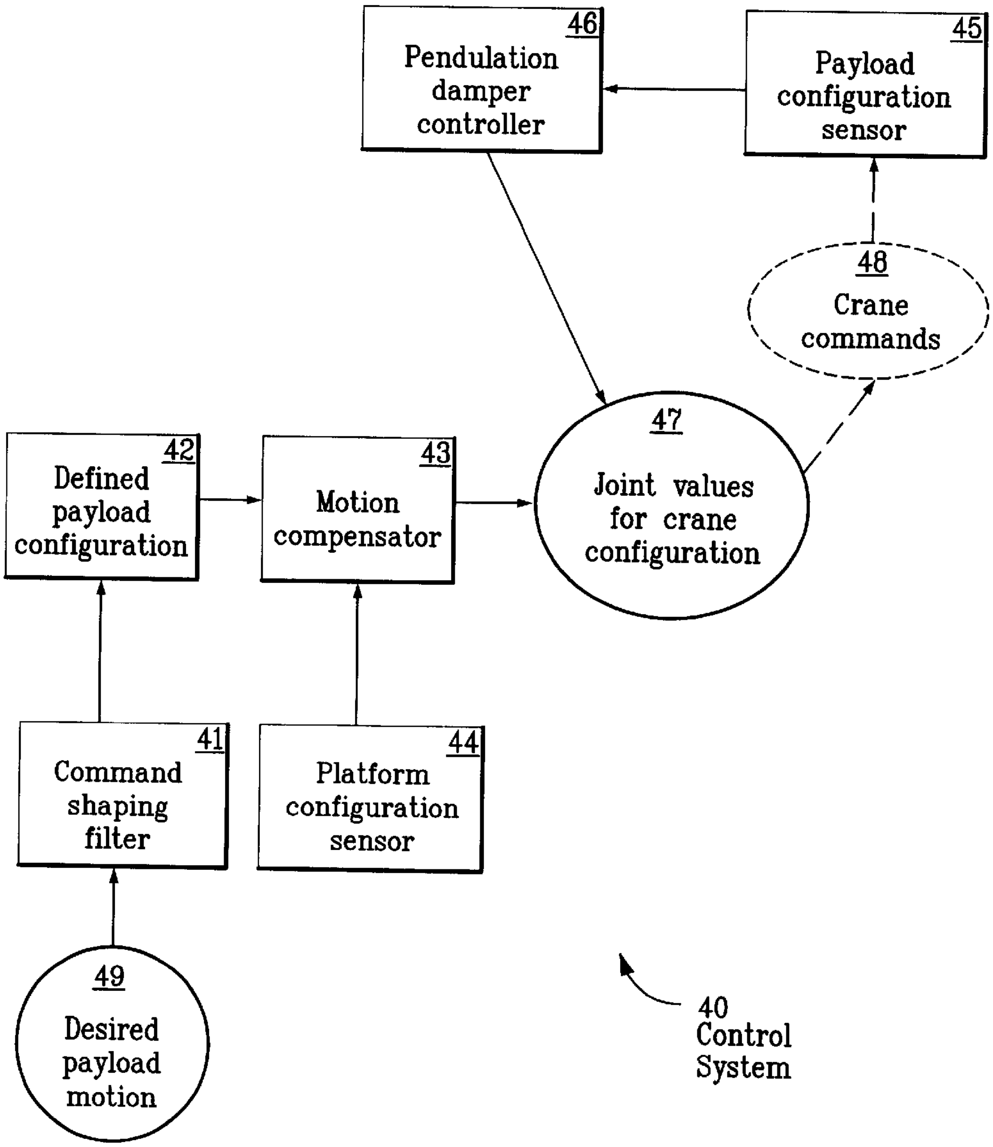
FIG. 4 is a medium-level schematic representation of a control system for generating crane commands corresponding to a desired payload motion, utilizing a joint space implementation of the pendulation damper controller, according to the present invention.

FIG. 4 is a medium-level schematic representation of a control system for generating crane commands corresponding to a desired payload motion, utilizing a joint space implementation of the pendulation damper controller, according to the present invention. As shown in FIG. 4, control system 40 can generate crane commands 48 to control a crane mounted with a mobile platform in order to achieve desired payload motion 49. Command shaping filter 41 can generate defined payload configuration 42 by filtering out a residual payload pendulation frequency of the crane from desired payload motion 49. Motion compensator 43 can generate crane commands from defined payload configuration 42 and platform configuration sensor 44 to drive the crane to maintain the payload in the defined configuration relative to the inertial frame. Payload configuration sensor 45 can sense the current actual payload configuration, then pendulation damper controller 46 can determine an amount of pendulation from a difference between the current actual payload configuration sensed by payload configuration sensor 45 and defined payload configuration 42. In a joint space implementation, as shown in FIG. 4, pendulation damper controller 46 can output offsets to joint values for crane configuration 47 which can generate crane commands 48 and can be used to drive the crane to reduce the amount of pendulation.

Platform Configuration:

Platform configuration sensor 44 can be a platform motion sensor and can indicate the current configuration comprising current position and orientation of the platform relative to the inertial frame. Platform motion sensors can include examples as discussed above for the platform motion sensor for sensor system 16.

Payload Configuration:

Payload configuration sensor 45 can comprise examples discussed earlier for payload configuration sensor 24.

CARTESIAN IMPLEMENTATION OF PENDULATION DAMPER

Figure 5:
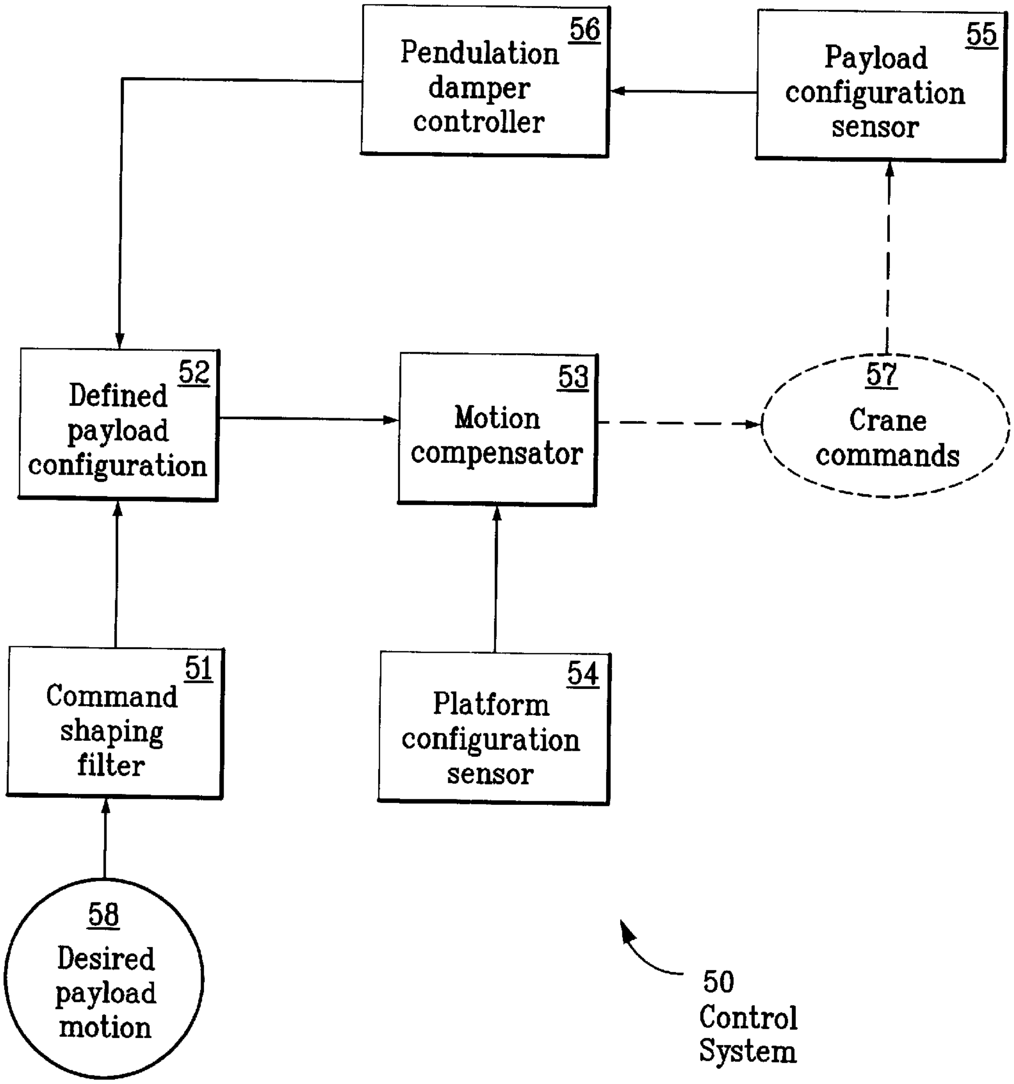
FIG. 5 is a medium-level schematic representation of a control system for generating crane commands corresponding to a desired payload motion, utilizing a Cartesian implementation of the pendulation damper controller, according to the present invention.

FIG. 5 is a medium-level schematic representation of a control system for generating crane commands corresponding to a desired payload motion, utilizing a Cartesian implementation of the pendulation damper controller, according to the present invention. As shown in FIG. 5, control system 50 can generate crane commands 57 to control a crane mounted with a mobile platform in order to achieve desired payload motion 58. Command shaping filter 51 can generate defined payload configuration 52 by filtering out a residual payload pendulation frequency of the crane from desired payload motion 58. Desired payload motion 58 can be generated from an operator's joystick or can be automatically generated by a computer functioning for the operator. The generated defined payload configuration can change as a function of time. Motion compensator 53 can generate compensated crane commands from defined payload configuration 52 and platform configuration sensor 54 to drive the crane to maintain the payload in the defined configuration relative to the inertial frame. Payload configuration sensor 55 can sense the current actual payload configuration, then pendulation damper controller 56 can determine an amount of pendulation from a difference between the current actual payload configuration sensed by payload configuration sensor 55 and defined payload configuration 52. In a Cartesian implementation, as shown in FIG. 5, pendulation damper controller 56 can generate offsets which can be added to defined payload configuration 52 to produce a new defined payload configuration that can generate crane commands 57 that also damp pendulation.

The previous discussion for platform configuration sensor 44 and payload configuration sensor 45 can apply to platform configuration sensor 54 and payload configuration sensor 55.

EXAMPLE CRANE

Figure 6:
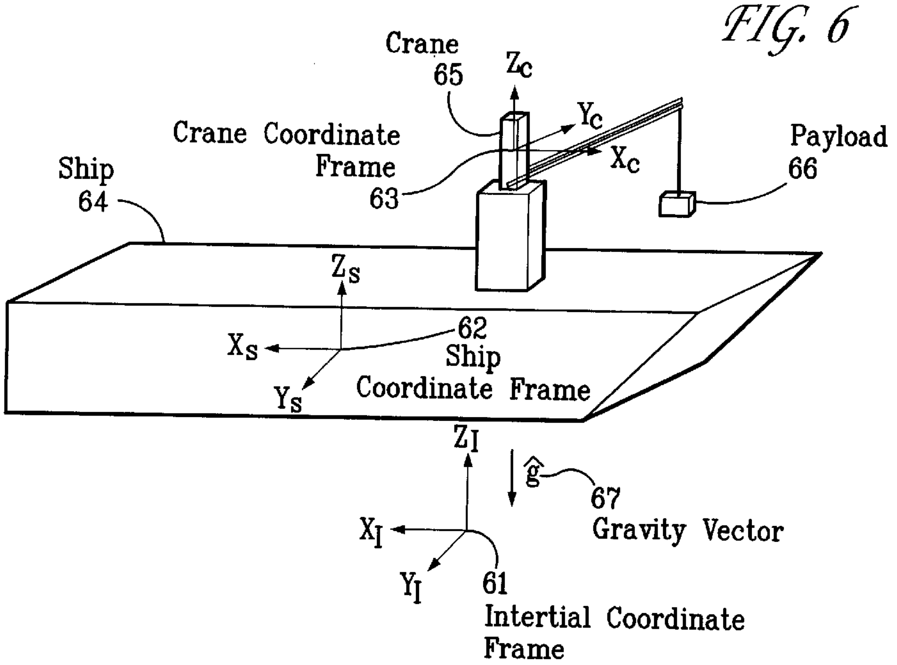
FIG. 6 is a diagram of an example shipboard rotary boom crane utilizing the control system of the present invention.

FIG. 6 is a diagram of an example shipboard rotary boom crane utilizing a control system according to the present invention. The example comprises motion compensation, pendulation damping, and command shaping in a controller used to suppress unwanted pendulation of a crane payload on a moving ship. FIG. 6 illustrates the coordinate systems chosen for this controller example. Alternate coordinate systems can be used. FIG. 6 depicts an embodiment of crane 65 mounted with ship 64 and hoisting payload 66. Example inertial coordinate frame 61 is chosen fixed to earth (and therefore an approximation to an inertial frame) with the z-axis parallel with gravity vector 67 and at a distance sufficiently close to ship 64 to utilize the approximation of a flat earth. Ship coordinate frame 62 is attached to the ship with the x axis pointing aft and the z-axis perpendicular to the ship deck. Any convenient method can be used to describe the motion of the ship and its coordinate system relative to inertial coordinate frame 61 (for example: roll, pitch yaw, heave, surge, sway) as long as it can be converted to the form of a homogeneous transformation. See Koivo, pp. 36–41. Crane coordinate frame 63 is defined in the vicinity of the crane and is attached to ship 64. Since ship 64 is approximated as a rigid body, the position/orientation of crane coordinate frame 63 is fixed relative to ship coordinate frame 62.

Figure 7:
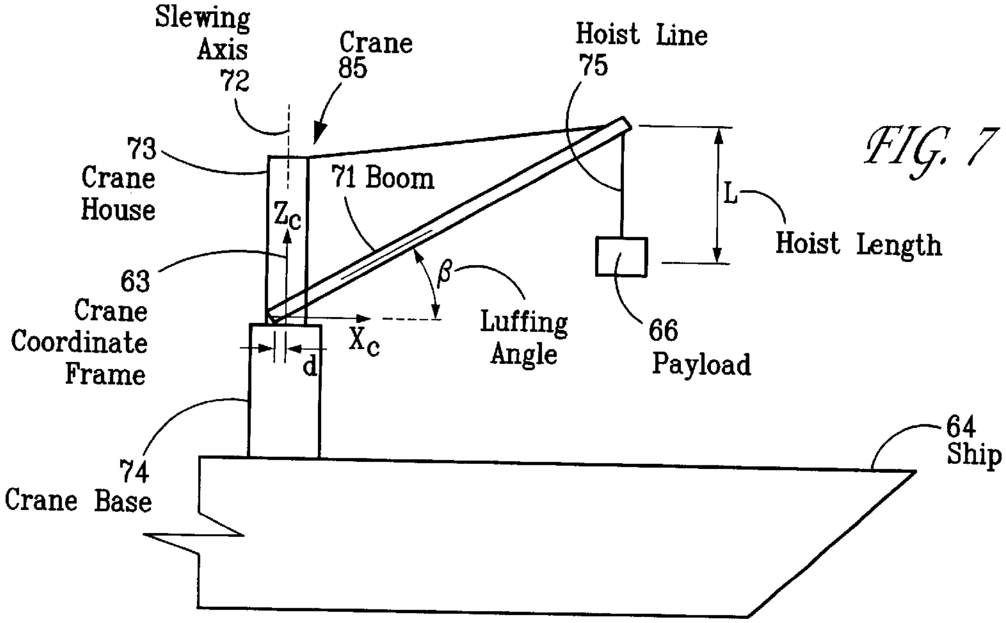
FIG. 7 is a detailed side view. diagram of an example crane utilizing the control system of the present invention.

FIG. 7 is a detailed side view diagram of an example crane utilizing the control system of the present invention. FIG. 8 is a detailed top view diagram of an example crane utilizing the control system of the present invention. FIGS. 7 and 8 illustrate the degrees-of-freedom utilized by crane 65 mounted with ship 64 and hoisting payload 66. Hoist length L is from the center of gravity of payload 66 to hoist-line attachment point shown at the tip of boom 71 in FIG. 7. FIG. 7 shows crane 65 comprising crane house 73 and crane base 74 with boom 71 offset distance d from a center of rotation about slewing axis 72. "Slewing" is seen as a rotation of crane house 73 and boom 71 about crane base 74 which is mounted with ship 64. Crane coordinate frame 63 is located such that slewing occurs about its z-axis (shown as stewing axis 72). The positive direction of slewing angle $\theta$ is shown in FIG. 8 and is determined according to the right-hand-rule about the z-axis.

"Luffing" is seen as a rotation of boom 71 about luffing axis 81 (shown in FIG. 8) relative to crane house 73 of crane 65. Luffing angle $\beta$ (shown in FIG. 7) has a value of zero when boom 71 is parallel with the x-y plane of crane coordinate frame 63, shown in FIG. 8, and increases as the tip of boom 71 rises. The axis of rotation about luffing axis 81 parallels the y-axis of crane coordinate frame 63, when at zero slewing angle $\theta$, though it is displaced offset distance d in the negative x-direction (shown in FIG. 7) for this example.

The final crane degree-of-freedom (DOF) is hoist length L of hoist-line 75 (referred to generically as a flexible-link). On crane ships, hoist-line 75 can be made of steel wire and can be lengthened or shortened, which is referred to as "hoisting".

Figure 10:
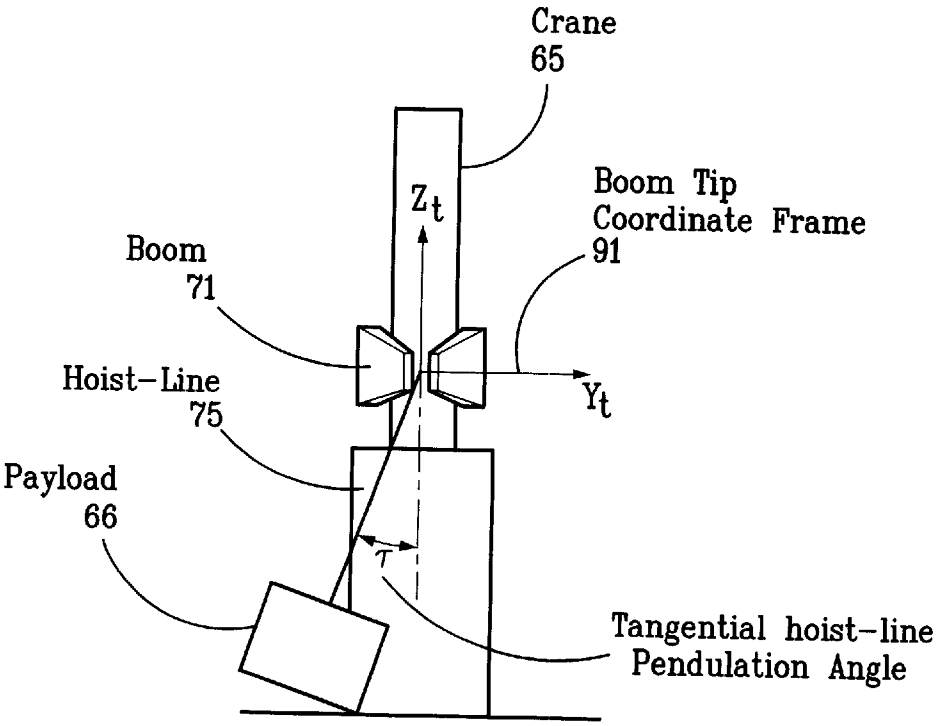
FIG. 10 is a detailed crane front view diagram, where luff angle β is zero, showing a tangential hoist-line pendulation angle for an example crane utilizing the control system of the present invention.

FIG. 9 is a detailed side view diagram showing a radial hoist-line pendulation angle for an example crane utilizing the control system of the present invention. FIG. 10 is a detailed crane front view diagram, where luff angle $\beta$ is zero, showing a tangential hoist-line pendulation angle for an example crane utilizing the control system of the present invention. FIGS. 9 and 10 illustrate the nomenclature used to describe the motion of the crane 65's unactuated degrees-of-freedom, the pendulation of payload 66 on hoist line 75. For convenience in this example, boom tip coordinate frame 91 is attached to boom 71 such that the x-axis of boom tip coordinate frame 91 is along the length of boom 71 and the z-axis of boom tip coordinate frame 91 is parallel to stewing axis 72 when at zero luffing angle β (shown in FIG. 7). Tangential hoist-line pendulation angle τ (shown in FIG. 10) is defined as the angle between hoist-line 75 and the projection of a vector representation of hoist-line 75 onto the x-z plane of boom tip coordinate frame 91. Payload 66 shown in FIG. 10 is experiencing positive tangential pendulation. Radial hoist-line pendulation angle ρ (shown in FIG. 9) is defined as the angle between the projection discussed above and the negative z-axis of boom tip coordinate frame 91. FIG. 9 shows a negative radial hoist-line pendulation angle ρ. For this example, and most practical cases, hoist-line 75 can be assumed to be straight between payload 66 and the tip of boom 71 which allows the position of payload 66 to be determined from hoist-line pendulation angles ρ and τ.

EXAMPLE EMBODIMENTS

An example pendulation-free control system for mobile platform cranes uses three controllers to maintain a payload in a substantially pendulation-free state. In the example, a rotary boom crane is mounted with a ship, as described above in FIGS. 6–10. The first controller is the "Command Shaper", and it acts as a filter. It prevents the operator from inadvertently adding unwanted motion or energy to the system through his commands. The second controller is a ship "Motion Compensator", and it acts as an energy isolator. It prevents energy from flowing into the payload. The third controller is the "Pendulation Damper", and it acts as an energy damper. It removes energy that has entered the system from either external sources or system nonlinearities. These three controllers can work together in several different configurations. In each configuration the goal of the controllers is the same. The difference is in how each controller interacts with the other controllers.

Figure 11:
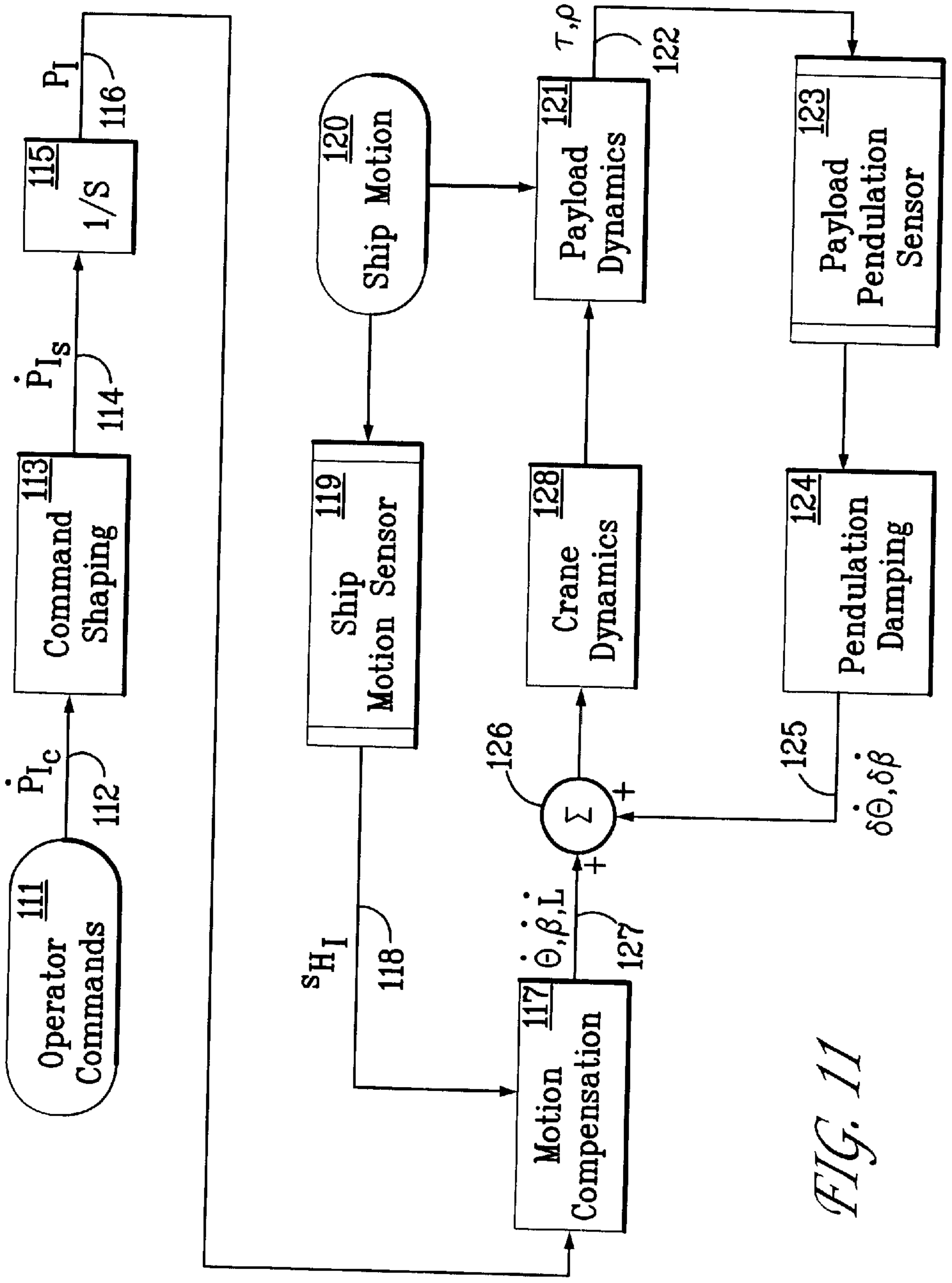
FIG. 11 is a flow diagram for one embodiment of a pendulation-free control system utilizing a joint space implementation of a pendulation damper.

FIG. 11 is a flow diagram for one embodiment of a pendulation-free control system utilizing a joint space implementation of a pendulation damper. In FIG. 11, operator commands 111 output a desired payload motion (velocity $\dot{P}_{1_c}$ 112) relative to an inertial coordinate system. Operator joystick commands can be mapped to the motion of the payload in inertial space in any convenient fashion as long as it can be converted to $\dot{P}_{1_c}$ 112.

To prevent operator commands 111 from inducing payload pendulation, operator commands 111 are filtered through command shaping 113 controller to remove frequency content that would excite payload pendulation. Simple spherical pendulums, which approximate behavior of the payload and hoist line, have a single frequency at which they resonate. This frequency $\omega_n$ is dependent on gravitational acceleration constant g and the length of the pendulum-like hoist-line, denoted L according to:

$$\omega_n = \sqrt{\frac{g}{L}}\ \text{(rad/sec)}. \tag{1}$$

Command shaping 113 filter has transfer function form:

$$\frac{\dot{x}_{1_s}}{\dot{x}_{1_c}} = \frac{K(s^2+\omega_n^2)}{(s+a)^3},\ \text{where} \tag{2}$$

$$\dot{P}_{1_c} = \begin{bmatrix} \dot{x}_{1_c} \\ \dot{y}_{1_c} \\ \dot{z}_{1_c} \end{bmatrix} \text{ and } \dot{P}_{1_s} = \begin{bmatrix} \dot{x}_{1_s} \\ \dot{y}_{1_s} \\ \dot{z}_{1_s} \end{bmatrix}. \tag{3}$$

Figure 12:
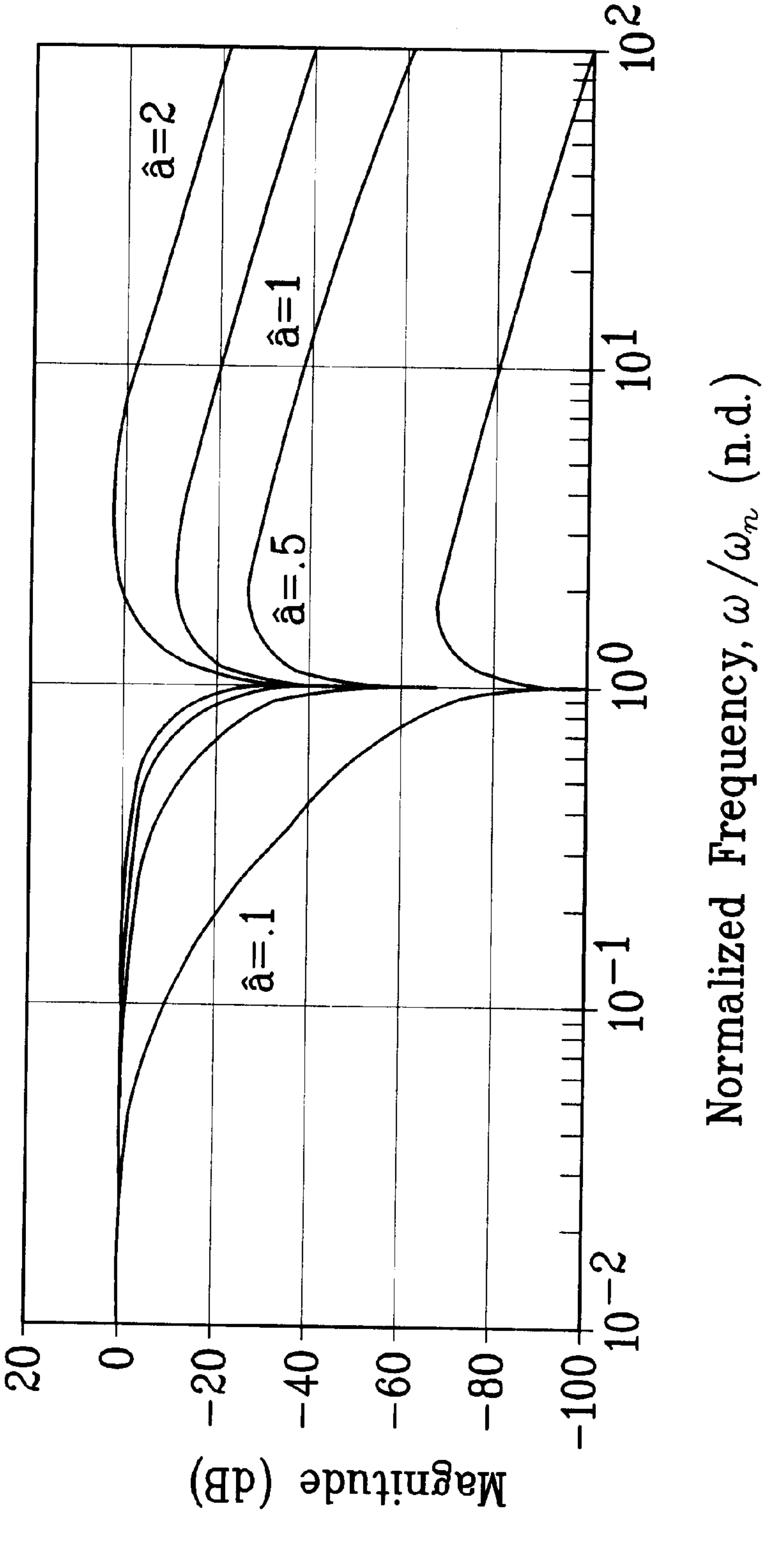
FIG. 12 is a graph showing command shaping filter frequency response and the effect of α on roll-off characteristics of a command shaping filter where $\hat{\alpha}=\alpha/\omega_n$.

$\dot{x}_{1_s}$ is a shaped desired payload motion, $\dot{x}_{1_c}$ is a desired payload motion in the x-direction, and variable β is based on a desired filter notching effect according to FIG. 12. FIG. 12 is a graph showing command shaping filter frequency response and the effect of a on roll-off characteristics of a command shaping filter where $\hat{\beta}=\beta/\omega_n$. A value of K can be chosen such that the overall transfer function has a unity gain, i.e.

$$K = \frac{a^3}{\omega_n^2}. \tag{4}$$

The same filter is used on $\dot{y}_{1_c}$ and the vertical velocity is not filtered (i.e., $\dot{z}_{1_s}=\dot{z}_{1_c}$) in this example, since vertical motion does not induce pendulation. Further details on command shaping filters can be found in Parker et al., "Experimental Verification of a Command Shaping Boom Crane Control System," American Controls Conference 1999, Jun. 2, 1999, San Diego, hereafter referred to as Parker'99, incorporated herein by reference, and Groom et al., "Swing-free Cranes via Input Shaping of Operator Commands," ISARC, Madrid, Spain, Sep. 22, 1999, incorporated herein by reference. Parker'99 and Groom teach a control method and experimental verification for reducing payload pendulation caused by operator commanded maneuvers in rotary boom cranes to remove components of a command signal which induce payload pendulation in a stationary crane environment.

After filtering to remove pendulation frequencies, velocity command ($\dot{P}_{1_s}$ 114) is numerically integrated (1/S 115) to produce defined payload configuration in an inertial frame ($P_1$ 116), where $$P_1 = \begin{bmatrix} x_1 \\ y_1 \\ z_1 \end{bmatrix},$$

which is updated with each time step iteration Δt of the controller. Motion Compensation 117 controller is used to generate crane velocities $\dot{\theta}$, $\dot{\beta}$, $\dot{L}$ 127, which can change as a function of time, to achieve defined payload configuration $P_1$ 116 while taking into account motion of the crane base. Ship motion motion sensor 119 determines ship motion 120 (in this example, the instantaneous position and orientation of the ship coordinate frame relative to the inertial coordinate frame referred to as platform configuration) and generates a homogeneous transformation representation of this configuration (${}^SH_1$ 118). A constant homogeneous transformation representation of the crane coordinate system relative to the ship coordinate system (${}^cH^S$) can be computed from a distance measurement between the ship and crane coordinate frames and their orientations as shown in FIG. 6. A homogeneous transformation between the inertial coordinate system and the crane coordinate system is computed by motion compensation 117 according to:

$${}^cH_1 = {}^cH_S\,{}^SH_1 \tag{5}$$

Defined payload configuration ($P_1$ 116), which is commanded by the operator, is converted into an instantaneous position $P_c$ in a crane coordinate system according to:

$$\left[\frac{P_c}{1}\right] = {}^cH_1\left[\frac{P_1}{1}\right]. \tag{6}$$

Motion Compensation 117 uses a crane inverse kinematic solver, which requires knowledge of the direction of gravity in the crane coordinate system and can be computed according to:

$$\left[\frac{\hat{g}_c}{0}\right] = {}^cH_1\left[\frac{\hat{g}_1}{0}\right], \tag{7}$$

where $$\hat{g}_1 = \begin{bmatrix} 0 \\ 0 \\ -1 \end{bmatrix}. \tag{8}$$

The crane inverse kinematic solver used in this example can be derived as follows: The position of the payload in the crane coordinate system can be computed according to:

$$P_c = \begin{bmatrix} -d\cos(\theta) \\ -d\sin(\theta) \\ 0 \end{bmatrix} + \begin{bmatrix} b\cos(\beta)\cos(\theta) \\ b\cos(\beta)\sin(\theta) \\ b\sin(\beta) \end{bmatrix} + L\hat{g}_c \tag{9}$$

where d is an offset of the luffing axis from the crane coordinate system (see FIG. 7), b is the distance along the boom from the luffing axis to the hoist line payout point on the boom tip, and the hoist line is assumed to be oriented along the direction of the gravitational unit vector $\hat{g}_c$. One method of solving these three non-linear simultaneous equations manipulates the equations to solve first for hoist (L) using the quartic equation:

$$AL^4 + BL^3 + CL^2 + DL + E = 1 \tag{10}$$

$$A = \frac{1}{4d^2}$$

$$B = \frac{P_c \cdot \hat{g}_c}{d^2}$$

$$C = \frac{-2d^2 - 2b^2 + 2|P_c|^2 + 4(P_c \cdot \hat{g}_c)^2}{4d^2} + g_{c_z}^2$$

$$D = \frac{d^2 P_c \cdot \hat{g}_c + b^2 P_c \cdot \hat{g}_c - |P_c|^2 P_c \cdot \hat{g}_c}{d^2} - 2P_{c_z} g_{c_z}$$

$$E = \frac{d^4 + b^4 + 2d^2b^2 - 2d^2|P_c|^2 - 2b^2|P_c|^2 + |P_c|^4}{4d^2} + P_{c_z}^2$$

where:

$$P_c = \begin{bmatrix} P_{c_x} \\ P_{c_y} \\ P_{c_z} \end{bmatrix}$$

and $$\hat{g}_c = \begin{bmatrix} g_{c_x} \\ g_{c_y} \\ g_{c_z} \end{bmatrix}. \tag{11}$$

The fourth order polynomial can be solved in closed form using various solution methods including those found in the CRC Math Tables, readily available to engineers and scientists. Of the four solutions produced, negative and imaginary solutions of (L) can be ignored.

The z component of equation (9) can then be used to solve for crane luff angle β according to:

$$\beta = \sin^{-1}\left(\frac{P_{c_z} - Lg_{c_z}}{b}\right), \tag{12}$$

where β is constrained to angles between zero and ninety degrees. The x and y components of equation (9) can be manipulated to solve for slew angle θ according to:

$$\sin(\theta) = \frac{P_{c_y} - Lg_{c_y}}{-d + b\cos\beta}, \tag{13}$$

$$\cos(\theta) = \frac{P_{c_x} - Lg_{c_z}}{-d + b\cos\beta}, \text{ and} \tag{14}$$

$$\theta = \tan^{-1}\left(\frac{\sin\theta}{\cos\theta}\right), \tag{15}$$

where trigonometry is used to determine the correct quadrant for θ. A velocity command for the crane drive system can be computed by taking these desired crane configuration values, subtracting the actual current crane configuration values and dividing by sample step time Δt of the controller to result in compensated commands, shown as crane velocities $\dot{\theta}$, $\dot{\beta}$, $\dot{L}$ 127 in FIG. 11.

The response of the crane drive system to the velocity commands is represented by crane dynamics 128, which includes drive motors, motor velocity servo controllers, and any crane elastic effects. These responses, along with ship motion 120 determine payload pendulation on the hoist line shown as payload dynamics 121. Payload dynamics 121 outputs pendulation angles τ and ρ 122 of the payload as defined in FIGS. 9 and 10.

To attenuate external disturbances such as wind and rain and unmodeled behavior of the crane, a third controller, pendulation damping 124, is included in the example system.

Use equation (9) with the current instantaneous values of (θ, β, L, $\hat{g}_c$), to determine the position of the payload with zero pendulation in crane coordinates. Use one of several vector methods, to compute the angles for zero pendulation ($\tau_0$ for tangential and $\rho_0$ for radial) in the example. Utilize payload pendulation sensor 123 (for example, payload configuration sensor 24 discussed above) to measure actual payload configuration or pendulation, denoted τ for tangential and ρ for radial. In the example, pendulation damping 124 is according to:

a tangential damper having a form of:

$$\delta\theta = \frac{K_\tau(\tau - \tau_0)}{\Delta t}; \text{ and} \tag{16}$$

a radial damper having a form of:

$$\delta\dot{\beta} = \frac{K_\rho(\rho - \rho_0)}{\Delta t}; \qquad (17)$$

where $\Delta t$ is a controller time step, $\delta\dot{\theta}$ is an offset to a slew angle velocity, $\delta\dot{\beta}$ is an offset to a luff angle velocity, and $K_\tau$ and $K_\rho$ are constant gains.

These velocity offsets $\delta\dot{\theta}$ and $\delta\dot{\beta}$ 125 are summed with the velocity outputs $\dot{\theta}$, $\dot{\beta}$, $\dot{L}$ 127 of motion compensation 117. The two controllers work together to maintain the payload at the defined payload configuration ($P_1$ 116).

Figure 13:
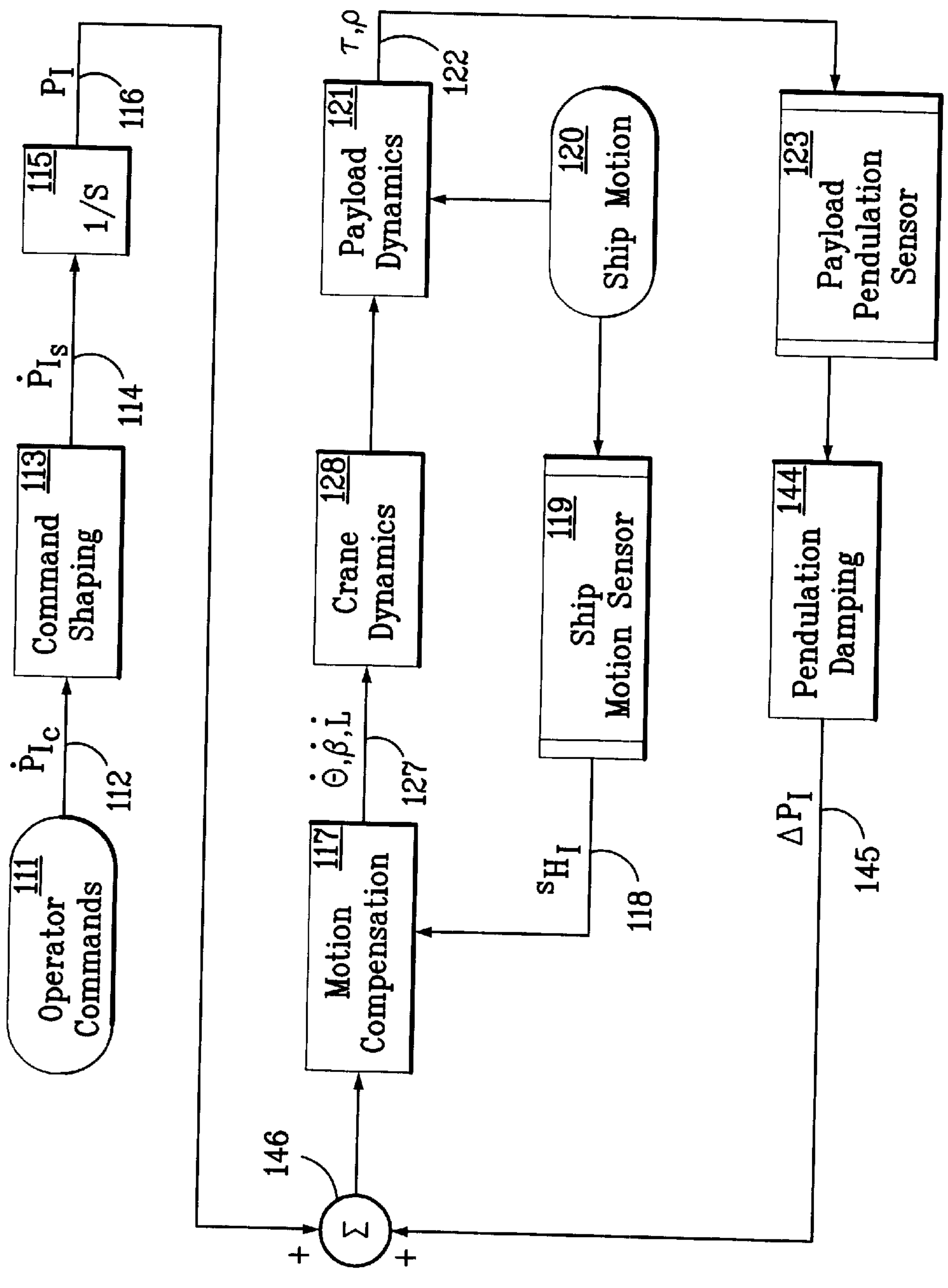
FIG. 13 is a flow diagram for another embodiment of a pendulation-free control system utilizing a Cartesian implementation of a pendulation damper.

FIG. 13 is a flow diagram for another embodiment of a pendulation-free control system utilizing a Cartesian implementation of a pendulation damper. The main difference is that the damper is implemented by producing an offset in the defined payload configuration $P_1$ 116.

Pendulation damping 144 produces offsets $\Delta P$, 145, where $$\Delta P_1 = \begin{bmatrix} \delta x_1 \\ \delta y_1 \\ \delta z_1 \end{bmatrix},$$

which are summed with defined payload configuration $P_1$ 116 prior to input to motion compensator 117. In this example, offsets $\Delta P_1$ 145 are generated using proportional control on a pendulation angle, similar to the offsets given by equations 16 and 17 in the example joint space implementation of the damper.

In FIG. 13, only 144, 145, and 146 are new (and different from 124, 125, and 126 in FIG. 11). All other inputs, outputs, and blocks remain the same in the two example implementations.

CRANE CONTROL METHOD FOR MOTION COMPENSATION

A method according to the present invention generates crane commands to achieve a desired payload motion by compensating for platform motion to maintain a crane payload in a defined configuration relative to an inertial frame. The present invention can further comprise damping payload pendulation. The present invention can further comprise filtering out a residual payload pendulation frequency from the desired payload motion.

Figure 14:
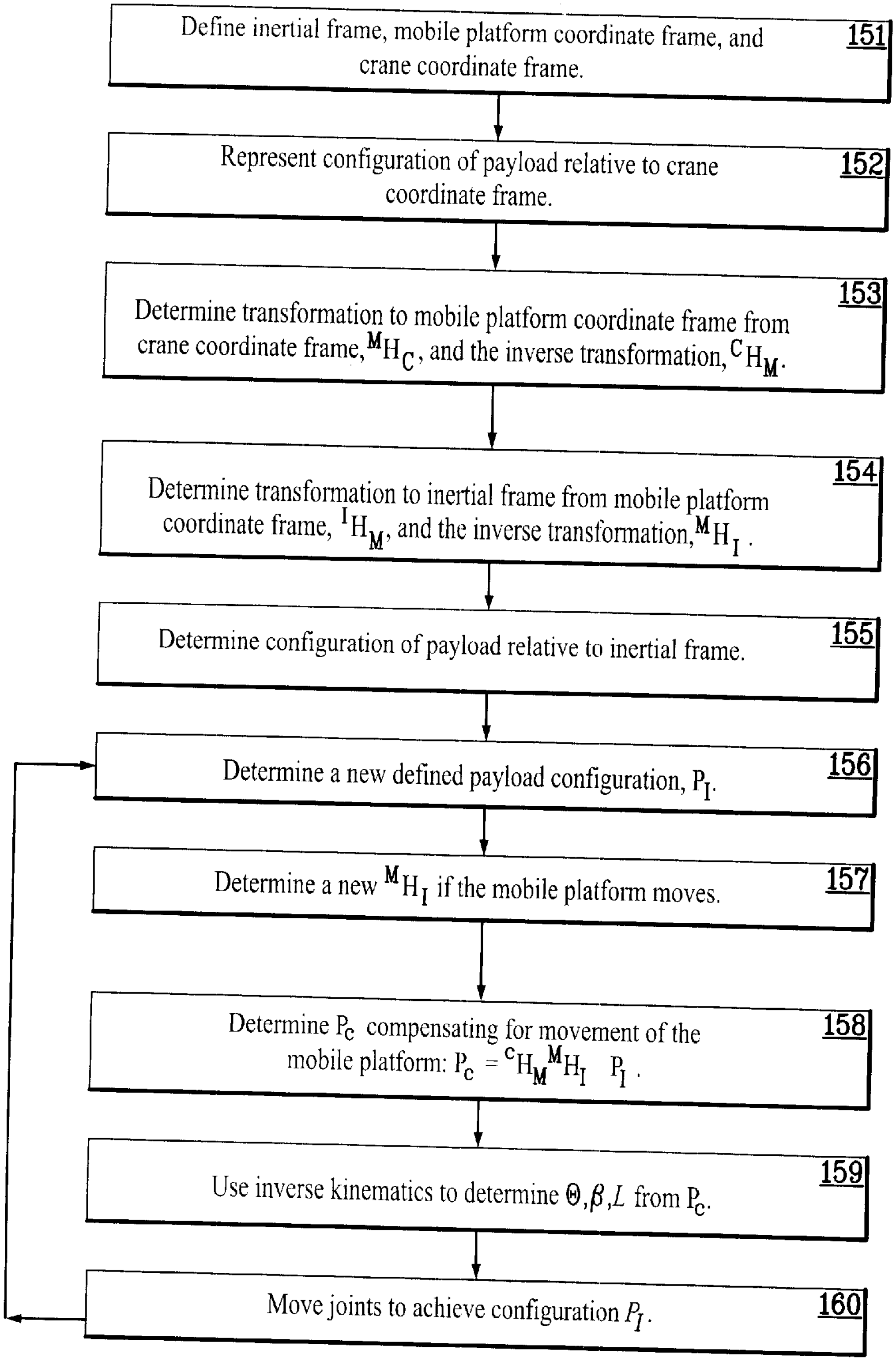
FIG. 14 is a flow diagram depicting a crane control process of compensating for platform motion, according to the present invention.

FIG. 14 depicts a crane control process of compensating for platform motion, according to the present invention.

The first five steps are initialization steps. Define inertial frame, mobile platform coordinate frame, and crane coordinate frame, step 151. An inertial reference frame can be a fixed position relative to earth. Using this fixed position, a moving object (for example, a ship or a mobile platform) can describe its configuration (position and orientation) relative to the inertial frame.

Represent a configuration of a payload relative to the crane coordinate frame, step 152. Examples of payload configuration sensors are given in the previous discussion for payload configuration sensor 24 for determining the configuration of the payload relative to a crane endpoint. Determine a transformation to the mobile platform coordinate frame from the crane coordinate frame, denoted ${}^M H_C$, and the inverse transformation to the crane coordinate frame from the mobile platform coordinate frame, denoted ${}^C H_M$, step 153. If the crane is in a fixed position on the mobile platform, its position is constant and need be determined only once. If the crane can be re-positioned on the mobile platform, its position can be determined each time the crane is re-positioned.

Determine a transformation to the inertial frame from the mobile platform coordinate frame, denoted ${}^I H_M$, and its inverse transformation to the mobile platform coordinate frame from the inertial frame, denoted ${}^M H_1$, step 154. The position and orientation of one coordinate frame relative to another frame can be specified with a homogeneous transformation (for example, a 4×4 matrix). For example, given a point position of the payload in the inertial frame, denoted $P_1$, the position of the payload in another coordinate frame such as the mobile platform coordinate frame, denoted $P_M$, can be computed using the homogeneous transformation matrix between the two frames, denoted ${}^M H_1$, according to:

$$P_M = {}^M H_1 P_1. \qquad (18)$$

Determine the configuration of the payload relative to the inertial frame, step 155, using the following equation:

$$P_1 = {}^1 H_M {}^M H_C P_C, \qquad (19)$$

where ${}^1H_M = ({}^M H_1)^{-1}$ and ${}^M H_C = ({}^C H_M)^{-1}$.

As long as a crane operator desires motion cancellation, continue looping through the following steps. Determine a time-dependent defined payload configuration, denoted $P_1$, from any commands for desired payload motion, step 156. Both desired payload motion and defined payload configuration can change as a function of time.

Determine a new ${}^M H_1$, step 157, if the mobile platform experiences motion relative to the inertial frame. Note that if the mobile platform experiences motion, then the initial payload configuration experiences motion relative to the inertial frame and can be at a new position and orientation. In order to maintain the defined payload configuration relative to the inertial frame, it can be necessary to compensate for the motion.

Determine a payload configuration relative to the crane coordinate frame, $P_C$, step 158, compensating for movement of the mobile platform. Use the following equation with the ${}^M H_1$ from step 157 and ${}^C H_M$ from step 153 to obtain a compensated payload configuration in the crane coordinate frame:

$$P_C = {}^C H_M {}^M H_1 P_1. \qquad (20)$$

Use inverse kinematics to determine θ, β, L from $P_C$, step 159. Crane manipulator joint values and the length of the flexible-link (for example, θ, β, L) can be determined to achieve $P_C$ and to maintain the payload in the defined payload configuration, denoted $P_1$.

The crane boom angle can be changed to θ, β, L to maintain the crane's flexible-link in a substantially parallel orientation to a gravitational vector and payload position at $P_1$. Move crane joints to achieve configuration $P_1$, step 160. Crane commands suitable for driving the crane can be transmitted to crane servo controllers and to crane motors responsive to the crane servo controllers.

As discussed earlier, at least two approaches can be used to determine payload configuration: (1) flexible-link measurements with inference to what the payload is doing in a Cartesian system, (2) a joint space approach comprising manipulator joint configuration and manipulator link descriptions with the length of the flexible-link, and combinations of the approaches.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A control system for driving a crane according to a desired payload motion for a substantially pendulation-free actual payload motion, wherein the crane is mounted with a platform characterized by a changeable configuration, wherein the crane comprises a manipulator, a flexible-link attached to the manipulator, and a payload suspended from the flexible-link, wherein the control system comprises:

a) a command shaping filter, generating a defined payload configuration by substantially removing payload pendulation frequencies from the desired payload motion;

b) a motion compensator, generating compensated commands from the defined payload configuration and the platform configuration, wherein compensated commands drive the crane to maintain the payload in the defined payload configuration relative to an inertial frame;

c) a payload configuration sensor, indicative of the current actual payload configuration; and d) a pendulation damper controller, determining an amount of pendulation between the current actual payload configuration and the defined payload configuration and driving the crane to reduce the amount of pendulation.

2. The control system of claim 1, a) wherein the motion compensator is adapted to maintain the payload in the defined payload configuration relative to the inertial frame according to:

$$P_C = {}^{C}H_M {}^{M}H_1 P_1,$$

where $P_C$ is the configuration of the payload in a crane coordinate frame, $P_1$ is a representation of the defined payload configuration in the inertial frame, ${}^{M}H_1$ is a transformation to a platform coordinate frame from the inertial frame, and ${}^{C}H_M$ is a transformation to the crane coordinate frame from the platform coordinate frame; and b) wherein the motion compensator comprises an inverse kinematic solver to determine a manipulator joint configuration and the length of the flexible-link to achieve $P_C$.

3. The control system of claim 1, wherein:

a) the manipulator comprises substantially rigid links connected by manipulator joints;

b) the crane comprises:

i) a plurality of servo controllers; and ii) a plurality of motors, driving the manipulator joints and the length of the flexible-link, the plurality of motors operationally connected and each responsive to at least one of the plurality of servo controllers; and c) wherein driving the crane comprises transmitting crane commands to the plurality of servo controllers.

4. A control system for generating crane commands from a desired payload motion for substantially pendulation-free actual payload motion, wherein the crane is mounted with a base platform characterized by a changeable configuration, wherein the crane comprises a manipulator, a flexible-link attached to the manipulator, and a payload suspended from the flexible-link, wherein the control system comprises:

a) a platform motion sensor, indicative of a motion of the base platform relative to an inertial frame; and b) a motion compensator, responsive to the platform motion sensor, generating crane commands to maintain the payload substantially in a defined payload configuration relative to the inertial frame.

5. The control system of claim 4, wherein in the defined payload configuration the flexible-link is substantially parallel to a gravity vector.

6. The control system of claim 4, a) wherein the motion compensator is adapted to maintain the payload in the defined payload configuration relative to the inertial frame according to:

$$P_C = {}^{C}H_M {}^{M}H_1 P_1,$$

where $P_C$ is the configuration of the payload in a crane coordinate frame, $P_1$ is a representation of the defined payload configuration in the inertial frame, ${}^{M}H_1$ is a transformation to a base platform coordinate frame from the inertial frame, and ${}^{C}H_M$ is a transformation to the crane coordinate frame from the base platform coordinate frame; and b) wherein the motion compensator comprises an inverse kinematic solver to determine a manipulator joint configuration and the length of the flexible-link to achieve $P_C$.

7. The control system of claim 4, where the crane commands comprise gantry-crane-commands.

8. The control system of claim 4, where the crane commands comprise rotary-jib-crane-commands.

9. The control system of claim 4, where the crane commands comprise rotary-boom-crane-commands.

10. The control system of claim 4, wherein:

a) the manipulator comprises substantially rigid links connected by manipulator joints;

b) the crane comprises:

i) a plurality of servo controllers; and ii) a plurality of motors, driving the manipulator joints and the length of the flexible-link, the plurality of motors operationally connected and each responsive to at least one of the plurality of servo controllers; and c) wherein crane commands comprise commands to the plurality of servo controllers.

11. A control system for generating crane commands to control a moveable crane, wherein the crane comprises a manipulator, a flexible-link attached to the manipulator, and a payload suspended from the flexible-link, wherein the crane is mounted with a mobile platform, the control system comprising:

a) a sensor system, comprising:

i) a platform motion sensor, indicative of a motion of the mobile platform relative to the inertial frame; and ii) a payload configuration sensor; and b) a control computer, generating crane commands corresponding to a desired payload motion and the sensor system, wherein the control computer is adapted to maintain the payload substantially in a defined payload configuration relative to an inertial frame, the control computer comprising:

i) a command shaping filter, causing the desired payload motion to have a residual payload pendulation frequency of the crane substantially removed from the desired payload motion, and generating the defined payload configuration;

ii) a motion compensator, responsive to the platform motion sensor and the defined payload configuration, causing the crane commands to maintain the payload in the defined payload configuration relative to the inertial frame; and iii) a pendulation damper controller, responsive to the payload configuration sensor, causing the crane commands to reduce an amount of pendulation between a sensed payload configuration and the defined payload configuration.

12. The control system of claim 11, wherein in the defined payload configuration the flexible-link is substantially parallel to a gravity vector.

13. The control system of claim 11, a) wherein the motion compensator is adapted to maintain the payload in the defined payload configuration relative to the inertial frame according to:

$$P_C = {}^{C}H_M {}^{M}H_1 P_1,$$

where $P_C$ is the configuration of the payload in a crane coordinate frame, $P_1$ is a representation of the defined payload configuration in the inertial frame, ${}^{M}H_1$ is a transformation to a mobile platform coordinate frame from the inertial frame, and ${}^{C}H_M$ is a transformation to the crane coordinate frame from the mobile platform coordinate frame; and b) wherein the motion compensator comprises an inverse kinematic solver to determine a manipulator joint configuration and the length of the flexible-link to achieve $P_C$.

14. The control system of claim 11, wherein the command shaping filter is selected from the group consisting of: double pulse filters, notch filters, filters for pulse sequences convolved with inputs, and combinations thereof.

15. The control system of claim 11, wherein the payload has a pendulation determined by a plurality of equations of motion, wherein:

a) the command shaping filter is a function of the plurality of equations of motion, and has the form:

$$U_i(s) = \frac{a^3(s^2 + \omega_i^2)}{\omega_i^2(s + a)^3} U_i^c(s),$$

wherein $U_i^C$ denotes the desired payload motion, s denotes a Laplace transformation variable, $U_i$ denotes a filtered desired payload motion, a denotes a design parameter, filter frequency $\omega_i$ changes according to changes in the length of the flexible-link, denoted L, according to:

$$\omega_i = \sqrt{\frac{g}{L}},$$

where g is the gravitational acceleration; and b) the defined payload configuration is the integral of the filtered desired payload motion $U_i$.

16. A control system for generating crane commands from a desired payload motion for substantially pendulation-free actual payload motion, wherein the crane is mounted with a mobile platform characterized by a changeable configuration, wherein the crane comprises a manipulator, a flexible-link attached to the manipulator, and a payload suspended from the flexible-link, wherein the control system comprises:

a) a sensor system, comprising:

i) a platform motion sensor, indicative of a motion of the mobile platform relative to an inertial frame; and ii) a payload configuration sensor; and b) a control computer, generating crane commands to control the crane, comprising:

i) a motion compensator, responsive to the platform motion sensor, causing the crane commands to maintain the payload in a defined payload configuration relative to the inertial frame; and ii) a pendulation damper controller, responsive to the payload configuration sensor, causing the crane commands to reduce an amount of pendulation between a sensed payload configuration and the defined payload configuration.

17. The control system of claim 16, wherein the pendulation damper controller is selected from the group consisting of: variable structure controllers, sliding mode controllers, proportional controllers, lead compensators, pendulation cancellation methods, and combinations thereof.

18. The control system of claim 16, wherein the pendulation damper controller comprises:

a) a tangential damper having a form of:

$$\delta\dot{\theta} = \frac{K_\tau(\tau - \tau_0)}{\Delta t};$$

and b) a radial damper having a form of:

$$\delta\dot{\beta} = \frac{K_\rho(\rho - \rho_0)}{\Delta t};$$

where flexible-link angles for zero pendulation in the defined payload configuration are denoted $\tau_0$ and $\rho_0$, the flexible-link angles for the sensed payload configuration are measured with sensors and denoted as $\tau$ and $\rho$, $\Delta t$ is a controller time step, $\delta\dot{\theta}$ is an offset to a slew angle velocity, $\delta\dot{\beta}$ is an offset to a luff angle velocity, and $K_\tau$ and $K_\rho$ are constant gains.

19. The control system of claim 16, wherein in the defined payload configuration the flexible-link is substantially parallel to a gravity vector.

20. The control system of claim 16, a) wherein the motion compensator is adapted to maintain the payload in the defined payload configuration relative to the inertial frame according to:

$$P_C = {}^{C}H_M {}^{M}H_1 P_1,$$

where $P_C$ is the configuration of the payload in a crane coordinate frame, $P_1$ is a representation of the defined payload configuration in the inertial frame, ${}^{M}H_1$ is a transformation to a mobile platform coordinate frame from the inertial frame, and ${}^{C}H_M$ is a transformation to the crane coordinate frame from the mobile platform coordinate frame; and b) wherein the motion compensator comprises an inverse kinematic solver to determine a manipulator joint configuration and the length of the flexible-link to achieve $P_C$.

21. A method to generate crane commands from a desired payload motion for substantially pendulation-free actual payload motion to control a crane mounted with a mobile platform characterized by a changeable configuration, wherein the crane comprises a manipulator, a flexible-link, and a payload suspended from the flexible-link, wherein the method comprises:

a) determining a mobile platform configuration, indicative of a motion of the mobile platform relative to an inertial frame;

b) determining a current actual payload configuration;

c) generating a defined payload configuration by filtering out a residual payload pendulation frequency of the crane from the desired payload motion;

d) generating compensated commands to maintain the payload in the defined payload configuration relative to the inertial frame, responsive to the mobile platform configuration and the defined payload configuration;

e) generating damped commands to reduce an amount of pendulation between the current actual payload configuration and the defined payload configuration; and f) generating crane commands from compensated commands and damped commands.

22. The method of claim 21, a) wherein the residual payload pendulation frequency of the crane is filtered according to the transformation:

$$U_i(s) = \frac{a^3(s^2+\omega_i^2)}{\omega_i^2(s+a)^3}U_i^c(s),$$

wherein $U_i^c$ denotes the desired payload motion, s denotes a Laplace transformation variable, $U_i$ denotes a filtered desired payload motion, α denotes a design parameter, filter frequency $\omega_i$, changes according to changes in the length of the flexible-link, denoted L , according to:

$$\omega_i = \sqrt{\frac{g}{L}},$$

Where g is the gravitational acceleration; and b) the defined payload configuration is the integral of the filtered desired payload motion $U_i$.

23. The method of claim 21, wherein the crane further comprises a plurality of servo controllers and a plurality of motors, the method further comprising: transmitting the crane commands to the plurality of servo controllers to achieve the substantially pendulation-free actual payload motion, each servo controller controlling at least one of the plurality of motors.

24. A method to generate crane commands from a desired payload motion for substantially pendulation-free actual payload motion to control a crane, wherein the crane comprises a manipulator, a flexible-link attached to the manipulator, and a payload suspended from the flexible-link, wherein the crane is mounted with a base platform, wherein the method comprises:

a) determining a platform motion, indicative of a motion of the base platform relative to an inertial frame;

b) determining a defined payload configuration indicative of the desired payload motion;

c) generating compensated commands to maintain the payload in the defined payload configuration relative to the inertial frame, responsive to the platform motion and the defined payload configuration; and d) generating crane commands from compensated commands.

25. The method of claim 24, wherein in the defined payload configuration the flexible-link is substantially parallel to a gravity vector.

26. The method of claim 24, wherein generating compensated commands comprises:

a) compensating for the platform motion according to:

$$P_C = {}^C H_M {}^M H_1 P_1,$$

where $P_C$ is the configuration of the payload in a crane coordinate frame, $P_1$ is the defined payload configuration in the inertial frame, ${}^M H_1$ is a transformation to a base platform coordinate frame from the inertial frame, ${}^C H_M$ is a transformation to the crane coordinate frame from the base platform coordinate frame; and b) using an inverse kinematic solver to determine a manipulator joint configuration and the length of the flexible-link to achieve $P_C$.

27. The method of claim 24, wherein the crane further comprises a plurality of servo controllers and a plurality of motors, wherein the method further comprises:

a) determining an actual payload configuration;

b) damping a payload pendulation to reduce an amount of pendulation between the actual payload configuration and the defined payload configuration; and c) transmitting the crane commands to the plurality of servo controllers to achieve the substantially pendulation-free actual payload motion, each servo controller controlling at least one of the plurality of motors.

* * * * *